United States Patent [19]

Nylund et al.

[11] Patent Number: 5,363,422
[45] Date of Patent: Nov. 8, 1994

[54] SPACER FOR RETAINING FUEL RODS IN A NUCLEAR REACTOR FUEL ASSEMBLY

[75] Inventors: Olov Nylund; Ragnar Månsson; Torsten Olsson; Tibor Farkas; Thorbjörn Sahlin, all of Västerås, Sweden

[73] Assignee: ABB Atom AB, Västerås, Sweden

[21] Appl. No.: 870,922

[22] Filed: Apr. 20, 1992

[30] Foreign Application Priority Data

Jun. 12, 1991 [SE] Sweden ................ 9101784

[51] Int. Cl.$^5$ .............................................. G21C 3/34
[52] U.S. Cl. ....................... 376/442; 376/439
[58] Field of Search ............... 376/438, 439, 442, 449, 376/443, 435; 976/DIG. 73, DIG. 74, DIG. 69, DIG. 71

[56] References Cited

U.S. PATENT DOCUMENTS

| | | | |
|---|---|---|---|
| 4,268,356 | 5/1981 | Kmonk et al. | 376/462 |
| 4,294,660 | 10/1981 | Christiansen | 376/442 |
| 4,326,922 | 4/1982 | Ferrari et al. | 376/435 |
| 4,416,852 | 11/1983 | Nylund | 376/438 |
| 4,588,550 | 5/1986 | Blomstrand et al. | 376/438 |
| 4,772,447 | 9/1988 | Manson et al. | 376/441 |
| 4,804,516 | 2/1989 | Thomazet et al. | 376/439 |
| 4,818,479 | 4/1989 | Christiansen et al. | 376/442 |
| 5,219,519 | 1/1993 | Matzner | 376/412 |

Primary Examiner—Donald P. Walsh
Assistant Examiner—Meena Chelliah
Attorney, Agent, or Firm—Watson, Cole, Grindle & Watson

[57] ABSTRACT

Spacers (10) with a cell-formed lattice-work for retaining parallel elongated elements such as fuel rods (5) into a bundle in a nuclear reactor fuel assembly are arranged in a suitable spaced relationship to each other along the bundle, and the cells are formed from tubular sleeves (1). Each one of these sleeves (1) offers a passage for one of the elements in order to fix the elements in relation to each other. Substantially half the number of sleeves (1) in a spacer (10), distributed evenly over the cross section of the bundle, are located in a first plane across the bundle and are joined to each other inside a first frame (11) surrounding the bundle, thereby forming a lattice of sleeves (1) and gaps (13). The remaining sleeves (1) of the spacer (10) are joined together inside a second frame (12) surrounding the bundle and are located in a second plane, separate from the first plane, across the bundle. These sleeves (1) also form a lattice of sleeves (1) and gaps (13), the sleeves (1) in the different planes being arranged in such a way that an element fixed by a sleeve (1) in the first plane freely traverses a gap (13) arranged in the second plane and vice versa.

8 Claims, 6 Drawing Sheets

SPACER FOR RETAINING FUEL RODS IN A NUCLEAR REACTOR FUEL ASSEMBLY

BACKGROUND AND SUMMARY OF THE INVENTION

The present invention relates to a spacer with a cell-formed lattice-work for retaining parallel elongated elements such as fuel rods into a bundle in the fuel assembly of a nuclear reactor. The spacers are thereby arranged in a suitable spaced relationship (about 5-6 dm) between each other along the bundle, and the cells of the spacers in the proposed device are formed from tubular sleeves, each of which offers a passage for one of the elements mentioned in order to fix the elements in relation to each other.

It is important that the above-mentioned spacers do not form too high a resistance to the coolant flow which flows inside the fuel assembly along the bundle and through the spacers.

Previous attempts to provide improved cooling in a boiling-type nuclear reactor (BWR) are known, wherein a number of sub-spacers are arranged and each sub-spacer takes up only a small part of the whole cross section of the bundle and thus braces the fuel rods only in this cross section. This may lead to problems in bracing the sub-bundles against each other. Another known solution comprises providing the bundle with spacers which alternately fix only the fuel rods positioned peripherally in the bundle (peripheral spacers) and the centrally located fuel rods positioned inside the former fuel rods (central spacers), respectively. Also in this case problems may arise in fixing the sub-bundles thus obtained in relation to one another.

In addition, the lattice-work in the above-mentioned known spacers consist of crossed plate bands standing on edge, which substantially form square cells. In a BWR this type of lattice provides less favourable cooling conditions than a lattice composed of sleeves in that the sleeves are given a circular shape which is able to conform better to the normally round fuel rods.

The invention is characterized in that substantially half the number of sleeves in a spacer, evenly distributed over the cross area of the bundle, are located in a first plane across the bundle and joined together so as to form a lattice-work of sleeves and gaps. The remaining sleeves of the spacer are joined to each other and located in a second plane, separate from the first plane, across the bundle, similarly forming a lattice-work of sleeves and gaps. The sleeves in the different planes are arranged in such a way that an element fixed by a sleeve in the first plane traverses a gap arranged in the second plane, and vice versa.

By means of the invention a spacer is provided in which the material area in the planes separated from each other is reduced to almost half of the material area of a spacer in which all the sleeves are positioned in the same plane across the bundle. Since the material area of the lattice-work in a plane across the bundle is in direct relation to the resistance provided by the lattice-work against the coolant flow, the cooling of the fuel assembly is improved most considerably.

Further, the spacers are provided with first and second side plates. In a boiling-water reactor (BWR) these side plates rest against the wall of the fuel box and the bundle is therefore fixed in a satisfactory manner in the lateral direction. In a pressurized-water reactor (PWR) the side plates of the spacers in one fuel assembly will rest against the side plates in an adjacent fuel assembly and this contributes in a corresponding manner to the fixing of the bundle.

According to a suitable embodiment, the first and second planes of a spacer are joined together by sleeves by joining together the first and second side plates. The lower ends of the sleeves in the first plane may then be positioned at a small distance (about 2-3 mm) from or on a level with the upper ends of the sleeves in the second plane. Alternatively, the sleeves may be joined together such that a certain small overlap arises between the ends of the sleeves.

According to another embodiment, especially adapted to a boiling reactor with an elongated fuel box against the walls of which the spacers rest, the spacer part with the first plane is arranged at approximately half a normal spacer distance from the spacer part with the second plane. The spacer parts are joined together by means of a guide sleeve surrounding the bundle and provided with windows, the guide sleeve having an external shape which provides a close fit against the walls of the fuel box. The guide sleeve provided with windows will then scrape off coolant flow flowing along the walls of the fuel box and throw it against the centre of the fuel assembly. This, in combination with the lower flow resistance of the sub-spacers, results in a very efficient cooling of the fuel rods of the bundle.

BRIEF DESCRIPTION OF THE DRAWINGS

The invention will be most readily understood with reference to the accompanying figures.

DETAILED DESCRIPTION OF THE PREFERRED EMBODIMENTS

Figure 1:
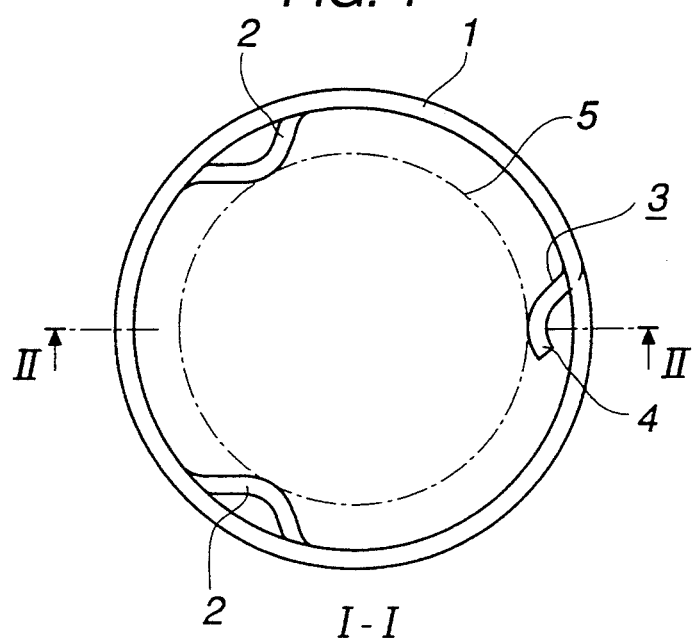
FIG. 1, which is a view along line I—I of FIG. 2, shows an example of a suitable sleeve for a spacer.

In FIG. 1, which shows a sleeve which is possible to use in a spacer according to the invention, 1 designates a tubular sleeve which is internally provided with fixed supports 2 and a spring member 3 with a contact surface 4 which makes contact with a fuel rod indicated at 5. The sleeve 1 is preferably given a straight circular cylindrical shape to be able to conform to the normally circular fuel rods 5.

Figure 2:
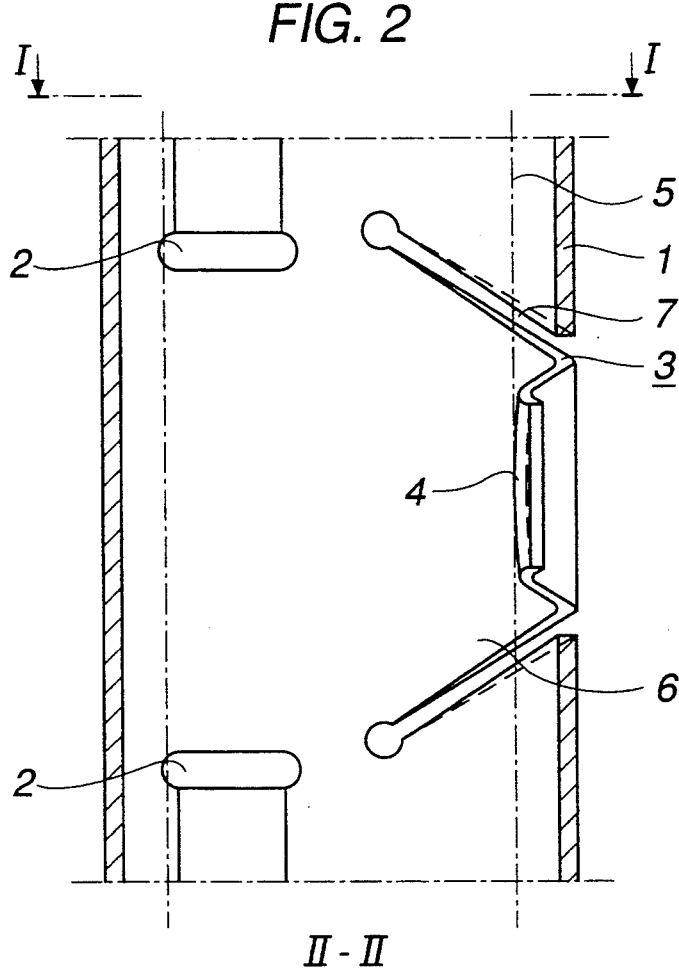
FIG. 2 shows a section II—II of FIG. 1.
Figure 3:
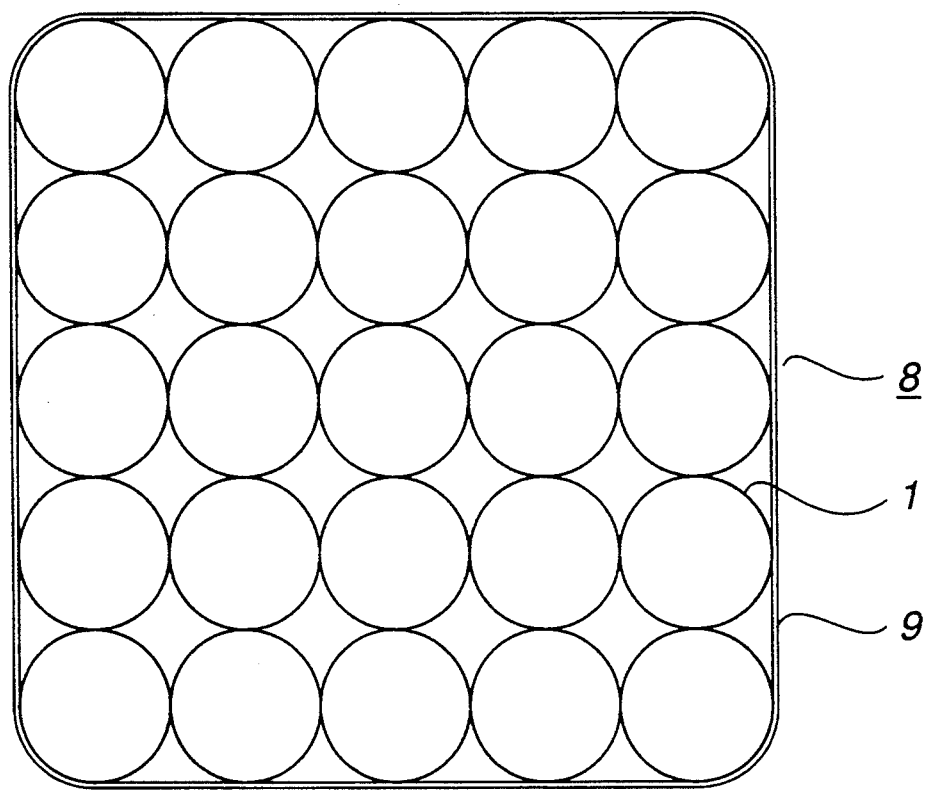
FIG. 3 shows a spacer composed of these sleeves lying in the same plane.

In FIG. 2, 6 designates the actual leaf spring which is cut out from the sleeve by means of grooves 7. Finally, FIG. 3 schematically shows how the sleeves 1 are composed into a spacer 8 of conventional type with all the sleeves in one and the same plane inside an outer frame 9.

Figure 4:
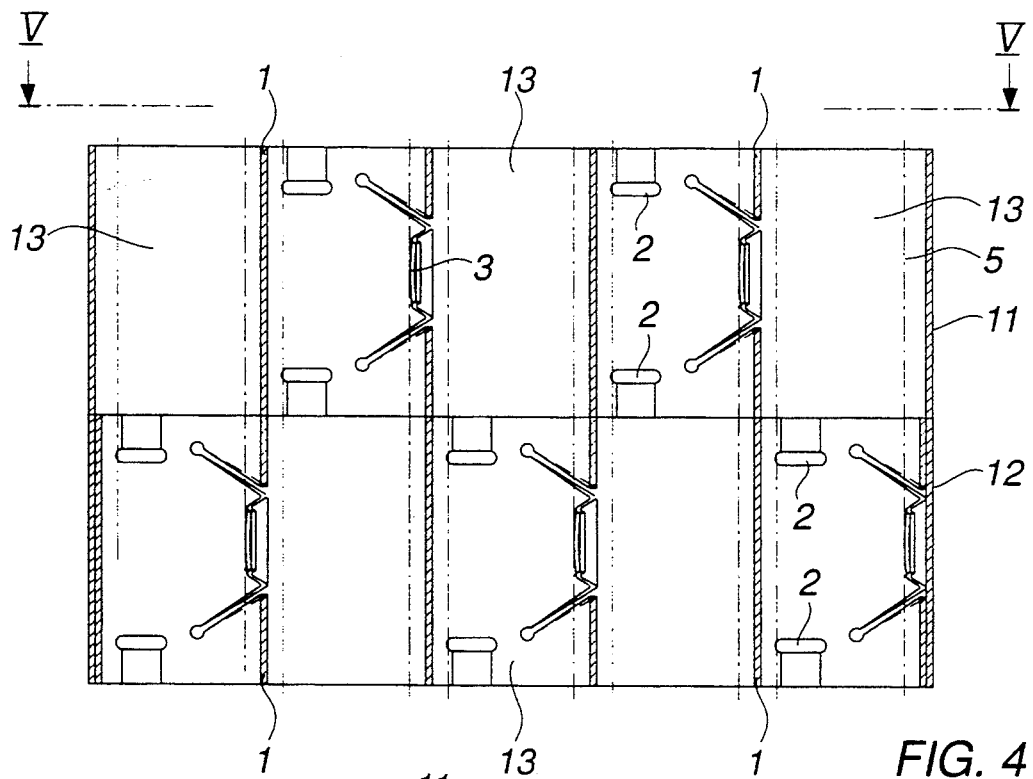
FIG. 4 shows a section IV—IV of a spacer according to FIG. 5, the sleeves being located in two different planes.

FIG. 4 shows a spacer 10 according to the invention, in which substantially half of the sleeves 1 are located in a first plane where they are retained by first side plates 11. In a second plane, separate from the first plane, the remaining sleeves 1 are arranged inside second side plates 12. In this particular embodiment every other sleeve is located in the upper first plane and every other in the lower second plane. Since the spacer is designed for 25 fuel rods 5, this means that 12 sleeves 1 are arranged in the upper plane and 13 in the lower plane. Between the sleeves, gaps 13 are formed. The sleeves 1 in one plane may be joined together by means of plates 14 which, however, must not encroach upon the so-called gaps and prevent the passage of the fuel rods 5 through these. The plates 14 may be given a length corresponding to the length of a sleeve 1 and be twisted such that they will function as guide vanes for the coolant flow and increase the turbulence therein.

Figure 5:
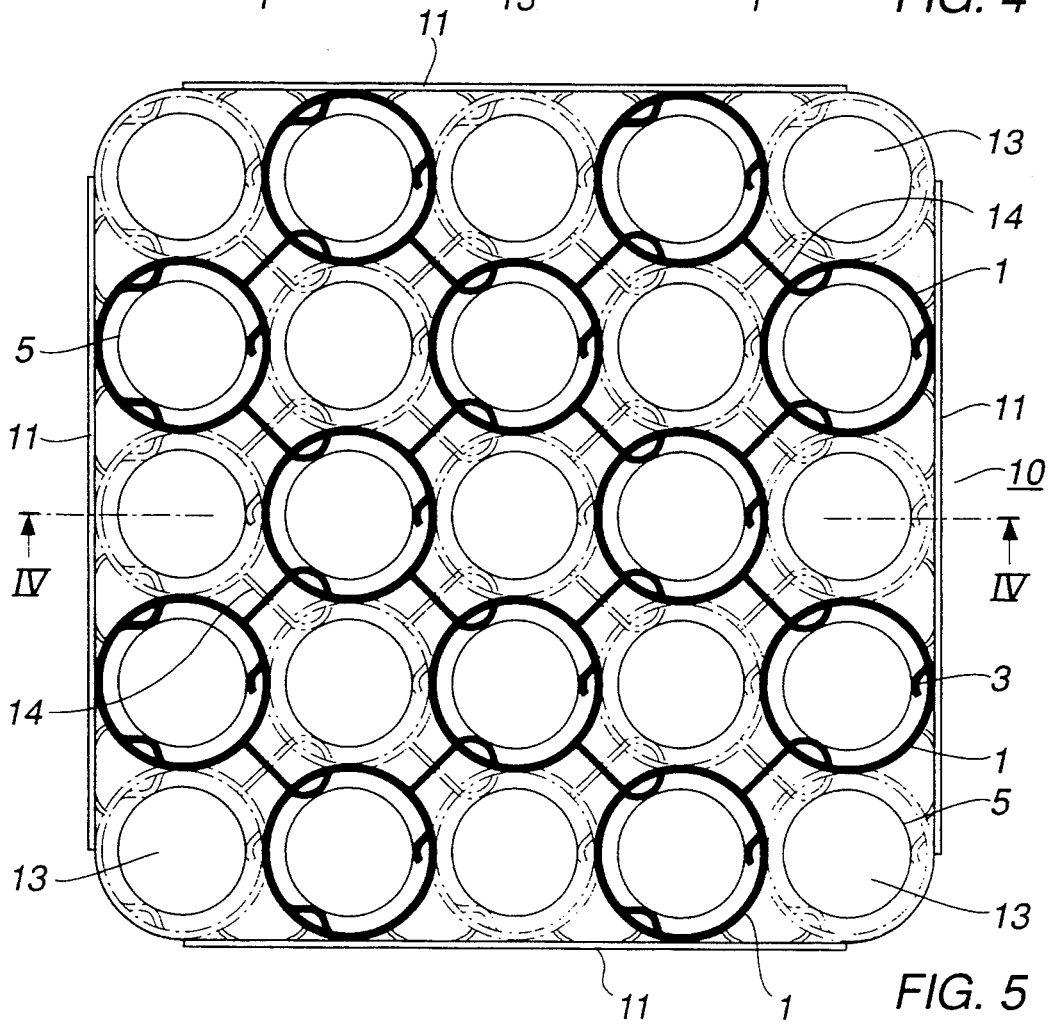
FIG. 5 shows a view V—V of FIG. 4.

As will be clear from FIGS. 4 and 5, a fuel rod 5, which passes through a sleeve 1 in the upper first plane and is braced therein by the fixed support 2 of the sleeve 1 and the spring member 3, will freely pass through a gap 13 between the sleeves 1 in the lower second plane. Conversely, a fuel rod 5 which passes through a sleeve 1 in the lower plane will pass through a gap 13 in the upper first plane.

In the embodiment shown in FIG. 4, the sleeves 1 in the upper plane rest against the sleeves 1 in the lower plane and the side plates 11 and 12 have been joined together so that they actually function as a unit.

Figure 6:
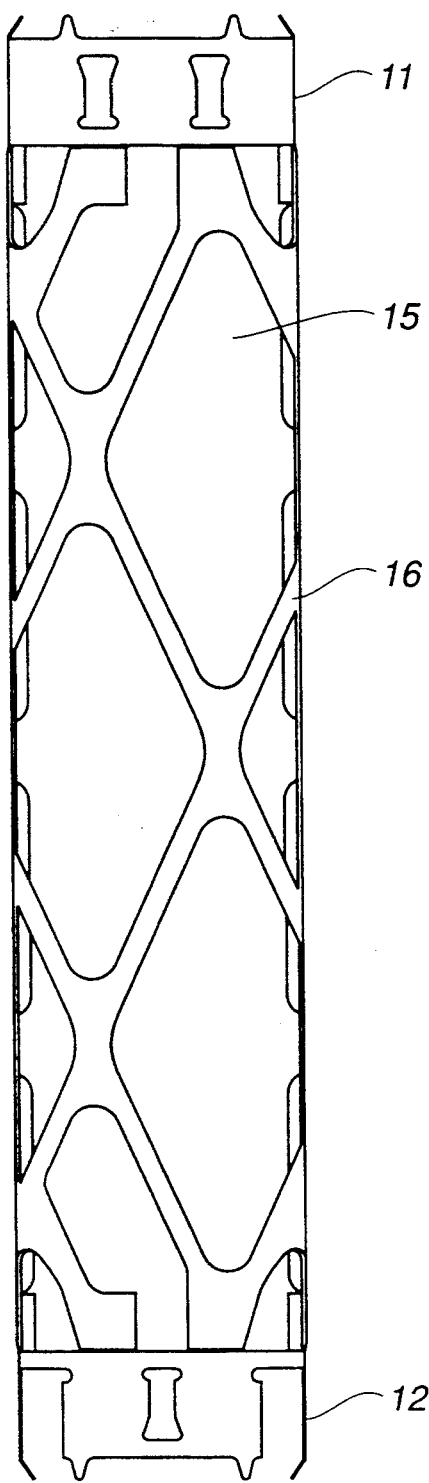
FIG. 6 shows an embodiment in which the spacer parts are arranged at half a normal spacer distance from each other and the spacer frames are joined together by a sleeve provided with windows.

FIG. 6 shows a special embodiment in which the spacer parts are located at a distance corresponding to half a normal spacer distance equal to 250–300 mm from each other. Then they have been joined together by a guide sleeve 16 provided with windows 15.

Figure 7:
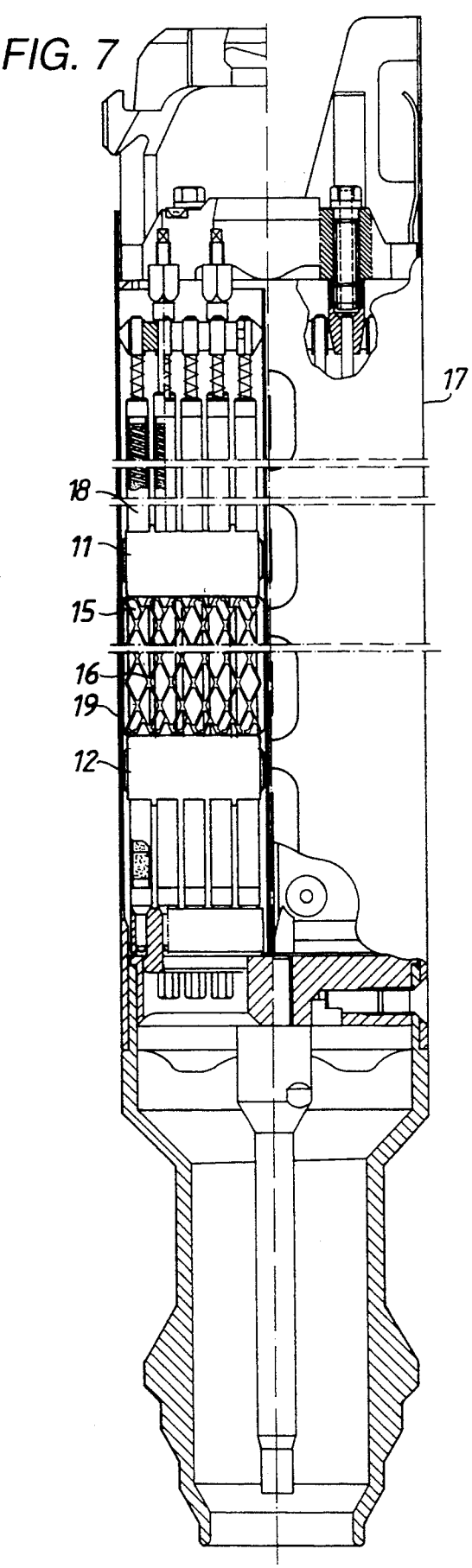
FIG. 7 schematically shows a fuel assembly for a boiling reactor.

FIG. 7 shows a fuel assembly 17 for a boiling reactor which has been divided into four chambers by means of partitions, each chamber intended for a bundle containing 5×5 fuel rods 18. The walls of the fuel assembly 17 are designated 19. The figure shows how a spacer according to the alternative of FIG. 6 is intended to be mounted. The same designations as in FIG. 6 are used in FIG. 7. As mentioned previously, the task of the guide sleeve 16 is to direct coolant flow flowing along the walls 19 of the fuel assembly 17 towards the centre of the fuel assembly 17.

In the embodiments shown every other sleeve 1 in a so-called rod lane is located in a first plane and every other sleeve 1 in a second plane. This distribution of the sleeves 1 is, of course, not necessary. The main thing is that the sleeves 1 are distributed relatively evenly over the cross section of the bundle with substantially half the number of sleeves in one plane and the remaining sleeves 1 in the other plane. The sleeves should also be distributed such that one sleeve 1 in one plane, viewed axially, covers a gap 13 in the other plane. It is possible, however, if it is not desired to join the side plates 11, 12 to each other, to arrange instead within the sub-spacers two sleeves 1 in the different planes in a line with each other such that the sub-spacers are fixed in relation to each other by means of, for example, two fuel rods which pass through sleeves 1 both in the upper and the lower plane.

Figure 9:
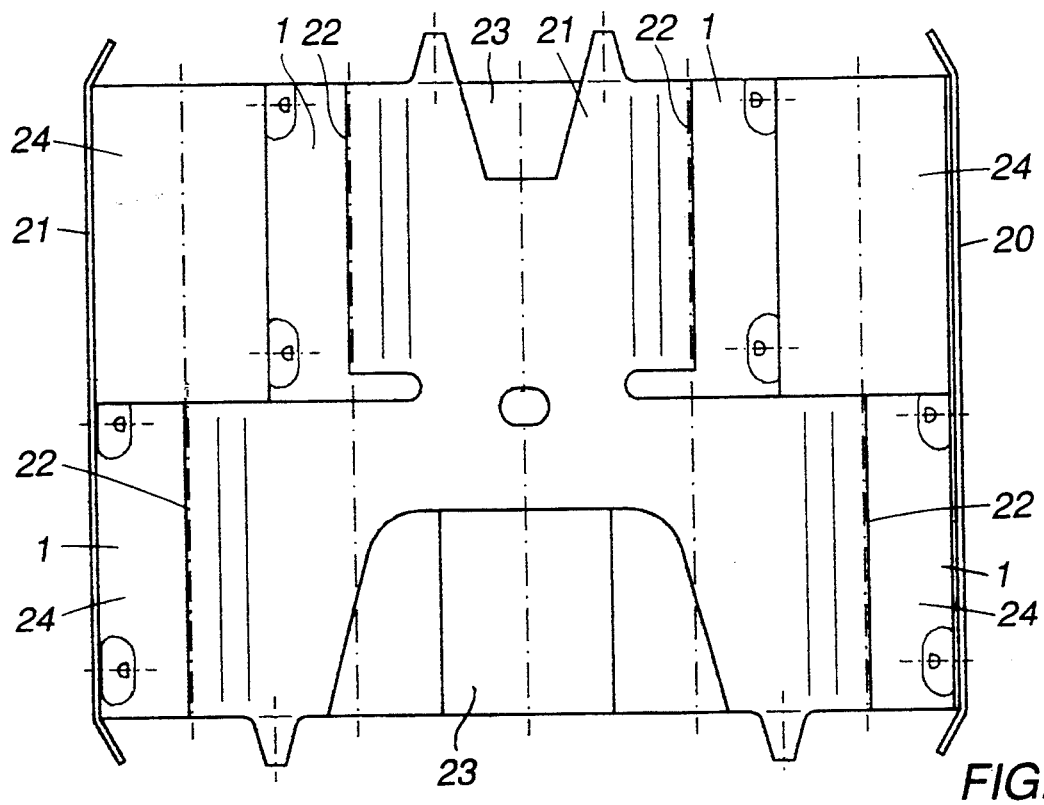
FIGS. 9 and 10 show the same spacer in two side views.
Figure 8:
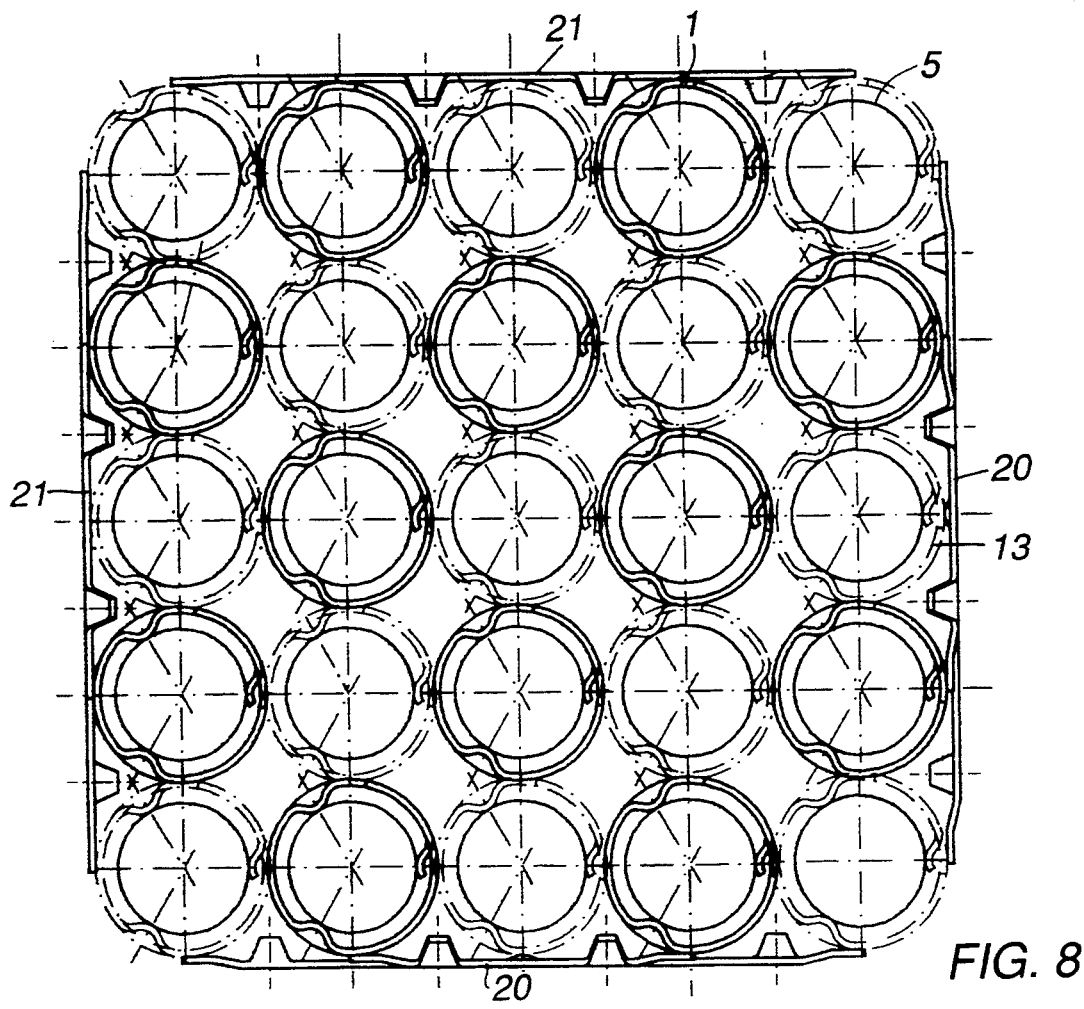
FIG. 8 shows a spacer with slimmed side plates, seen from above.
Figure 10:
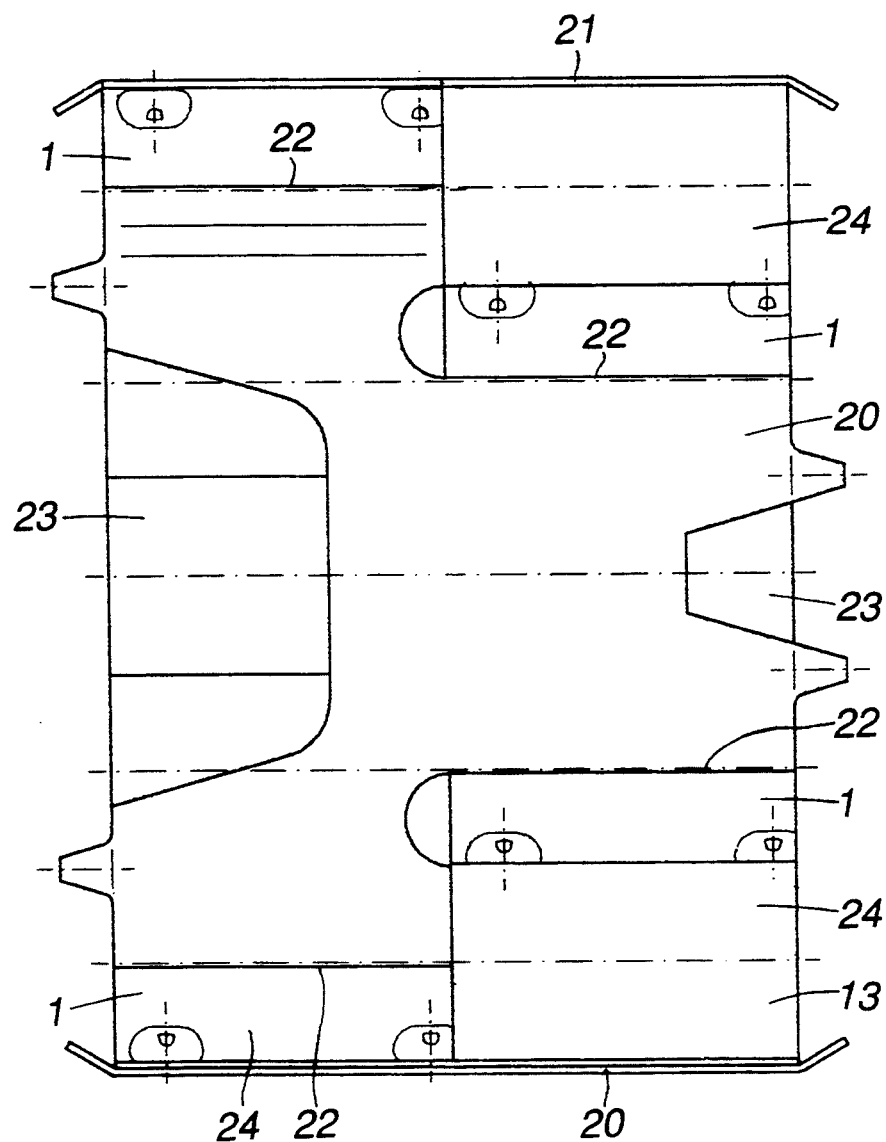

FIG. 8 shows an embodiment of the spacer according to the invention in which the side plates are slimmed down so the smallest possible size to reduce the coolant flow resistance of the spacer. In the figure, 1 designates sleeves, 13 gaps and 5 fuel rods according to the above. The slimmed side plates are designated 20 and 21. The same designations are inserted in FIGS. 9 and 10 where the welds 22 are located between the edges of the side plates 20, 21 and the sleeves 1 positioned inside these plates. The side plates 20, 21 have been reduced in size by the provision of recesses 23 and shortened portions 24. In this way, the side plates 20, 21 are given a minimal size and therefore provide reduced resistance to the coolant flow.

We claim:

1. A spacer comprising a cell-formed lattice-work for retaining parallel elongated elements such as fuel rods in a bundle in a nuclear reactor fuel assembly, said spacers being arranged in a spaced relationship to each other along the bundle, said cells being formed from a plurality of circular tubular sleeves, each one of said tubular sleeves offering a passage for one of said elements in order to fix the elements in relation to each other, wherein substantially half said plurality of circular tubular sleeves are distributed evenly over a cross section of the bundle in a first plane and are joined to each other, thereby forming a lattice of sleeves and gaps between the sleeves, the remaining half of said plurality of circular tubular sleeves being located over a cross section of the bundle in a second plane which is spaced from said first plane, and are joined to form a lattice of sleeves and gaps between the sleeves, the sleeves in said first and second planes being arranged in such a way that a normal length element fixed by a sleeve in said first plane traverses a gap arranged in said second plane and vice versa.

2. A spacer according to claim 1, wherein the sleeves in the first plane are provided with first side plates and the sleeves in the second plane with second side plates and said first and second side plates are joined to each other.

3. A spacer according to claim 1 in which the bundle is arranged in an elongated fuel assembly, wherein the spacer part with the sleeves of the first plane is arranged at approximately half a normal spacer distance from the spacer part with the sleeves of the second plane and the sleeves in the first plane are joined to the sleeves in the second plane by means of a guide sleeve which is provided with windows and which surrounds the bundle and has an external shape providing a close fit against the walls of the fuel assembly.

4. A spacer according to claim 1, wherein every other sleeve is placed in the first plane.

5. A spacer according to claim 1 wherein sleeves adjoining each other are connected together by means of plates.

6. A spacer according to claim 5, wherein the plates have substantially the same length as the sleeves and are twisted so as to function as guide vanes for a coolant flowing through the fuel assembly.

7. A spacer according to claim 1, including a spacer frame and wherein sleeves adjoining the frame of the spacer are welded to the frame.

8. A spacer according to claim 2, wherein outer surfaces of the side plates are reduced by means of recesses and shortened parts.

* * * * *